(12) United States Patent
Ronchetto et al.

(10) Patent No.: US 10,277,083 B2
(45) Date of Patent: Apr. 30, 2019

(54) METHOD FOR DESIGNING A ROTOR STRUCTURE OF A SYNCHRONOUS RELUCTANCE ELECTRIC MACHINE, AND CORRESPONDING SYNCHRONOUS RELUCTANCE ELECTRIC MACHINE

(71) Applicant: GE AVIO S.r.l., Rivalta di Torino (IT)

(72) Inventors: Davide Ronchetto, Rivalta di Torino (IT); Marco Cipriani, Turin (IT)

(73) Assignee: GE AVIO S.R.L, Rivalta di Torino (IT)

( * ) Notice: Subject to any disclaimer, the term of this patent is extended or adjusted under 35 U.S.C. 154(b) by 350 days.

(21) Appl. No.: 15/098,993

(22) Filed: Apr. 14, 2016

(65) Prior Publication Data

US 2016/0308408 A1    Oct. 20, 2016

(30) Foreign Application Priority Data

Apr. 14, 2015   (IT) .......................... 102015000011758

(51) Int. Cl.
*H02K 1/22*   (2006.01)
*H02K 1/24*   (2006.01)
(Continued)

(52) U.S. Cl.
CPC .............. *H02K 1/22* (2013.01); *H02K 1/246* (2013.01); *H02K 15/02* (2013.01); *H02K 19/103* (2013.01)

(58) Field of Classification Search
CPC ........... H02K 1/22; H02K 1/246; H02K 15/02
See application file for complete search history.

(56) References Cited

U.S. PATENT DOCUMENTS 3,652,885 A  *  3/1972  Honsinger .............. H02K 1/246
                                                              310/163
4,888,513 A  *  12/1989  Fratta ..................... H02K 1/246
                                                              310/166

(Continued)

FOREIGN PATENT DOCUMENTS

DE          10253950 A1      7/2003
DE       102014201740 A1     8/2014
(Continued)

*Primary Examiner* — Robert W Horn
(74) *Attorney, Agent, or Firm* — Ohlandt, Greeley, Ruggiero & Perle, LLP (57) ABSTRACT

A method for designing a rotor structure of a synchronous reluctance electric machine, wherein the rotor structure has an annular arrangement about a central opening designed to be engaged by a rotation shaft, and provided with a plurality of magnetic portions, a plurality of electromagnetic flux barriers interposed between the magnetic portions, and radial connecting elements, for the mechanical connection between radially adjacent magnetic portions, the electromagnetic flux barriers defining at least one maximum magnetic reluctance path along a maximum reluctance axis and a minimum reluctance path along a minimum reluctance axis. The method envisages defining the arrangement the electromagnetic flux barriers and/or the radial connecting elements so as to jointly optimize electromagnetic performance of the synchronous reluctance electric machine and mechanical resistance properties, in particular the resistance to centrifugal forces due to rotation about the rotation shaft.

19 Claims, 6 Drawing Sheets

(51) Int. Cl.
*H02K 19/10* (2006.01)
*H02K 15/02* (2006.01)

(56) References Cited

U.S. PATENT DOCUMENTS

| | | | | |
|---|---|---|---|---|
| 5,818,140 | A * | 10/1998 | Vagati | H02K 1/246 310/185 |
| 5,831,367 | A * | 11/1998 | Fei | H02K 1/246 310/216.107 |
| 5,893,205 | A * | 4/1999 | McClelland | H02K 1/246 29/598 |
| 6,064,134 | A * | 5/2000 | El-Antably | H02K 1/246 310/156.21 |
| 6,239,526 | B1 | 5/2001 | Oh et al. | |
| 6,259,181 | B1 * | 7/2001 | Kawano | H02K 1/246 310/162 |
| 6,675,460 | B2 * | 1/2004 | Reiter, Jr. | B22F 7/06 148/514 |
| 6,769,167 | B2 * | 8/2004 | Lee | H02K 1/246 29/524.1 |
| 6,849,983 | B2 * | 2/2005 | Tajima | H02K 1/246 310/156.53 |
| 7,112,908 | B2 * | 9/2006 | Takita | H02K 19/14 310/156.53 |
| 7,498,708 | B2 * | 3/2009 | Brown | H02K 1/276 310/156.08 |
| 7,560,846 | B2 * | 7/2009 | Lee | H02K 1/246 310/162 |
| 8,749,109 | B2 * | 6/2014 | Lendenmann | H02K 19/103 310/162 |
| 2003/0184185 | A1 * | 10/2003 | Yoshino | H02K 19/14 310/211 |
| 2006/0108888 | A1 | 5/2006 | Jung et al. | |
| 2007/0096579 | A1 * | 5/2007 | Aydin | H02K 1/2766 310/156.56 |
| 2007/0228862 | A1 * | 10/2007 | Welchko | H02K 1/2766 310/156.53 |
| 2008/0296994 | A1 | 12/2008 | El-Refaie et al. | |
| 2009/0224624 | A1 * | 9/2009 | Kumar | H02K 1/246 310/156.53 |
| 2013/0119819 | A1 * | 5/2013 | Lendenmann | H02K 1/246 310/216.107 |
| 2013/0320797 | A1 * | 12/2013 | Vyas | H02K 1/2766 310/156.43 |
| 2014/0191607 | A1 * | 7/2014 | Huang | H02K 1/246 310/156.08 |
| 2015/0015093 | A1 * | 1/2015 | Gontermann | H02K 1/246 310/44 |
| 2015/0162788 | A1 * | 6/2015 | Tsai | H02K 1/246 310/46 |
| 2015/0229170 | A1 * | 8/2015 | Koechlin | H02K 1/2766 310/156.53 |
| 2015/0280498 | A1 * | 10/2015 | Kolehmainen | H02K 1/246 310/216.107 |
| 2015/0303748 | A1 * | 10/2015 | Kolehmainen | H02K 1/246 310/216.107 |
| 2015/0372577 | A1 * | 12/2015 | Haussmann | H02K 1/246 310/211 |
| 2016/0301271 | A1 * | 10/2016 | Saito | H02K 1/2766 |
| 2016/0308408 | A1 * | 10/2016 | Ronchetto | H02K 1/22 |
| 2016/0352161 | A1 * | 12/2016 | Lange | H02K 1/2766 |
| 2017/0012481 | A1 * | 1/2017 | Ballweg | H02K 15/028 |
| 2018/0309336 | A1 * | 10/2018 | Ikaheimo | H02K 1/246 |

FOREIGN PATENT DOCUMENTS

| | | |
|---|---|---|
| WO | 2011018119 A1 | 2/2011 |
| WO | 2011154045 A1 | 12/2011 |
| WO | 2012000544 A1 | 1/2012 |
| WO | 2012000561 A1 | 1/2012 |

* cited by examiner

METHOD FOR DESIGNING A ROTOR STRUCTURE OF A SYNCHRONOUS RELUCTANCE ELECTRIC MACHINE, AND CORRESPONDING SYNCHRONOUS RELUCTANCE ELECTRIC MACHINE

The present invention relates to a method for designing a rotor structure of a synchronous reluctance electric machine, and to a corresponding synchronous reluctance electric machine.

BACKGROUND OF THE INVENTION

Electromagnetic devices, or electric machines, of the reluctance type (so-called "switched or synchronous reluctance machines"), are known which have anisotropic rotor structures, consisting of alternating portions of magnetic and non-magnetic material.

The portions of non-magnetic material constitute electromagnetic flux barriers and may also consist of voids (in this case, air constituting the non-magnetic material), of suitable shape and dimension within rotor structures; the magnetic portions, having high magnetic permeability, constitute the magnetic poles of the rotor structure.

Examples of reluctance electric machines are described in document U.S. Pat. No. 5,818,140, which discusses some general rules for the design of an electric machine with reduced torque ripple, in particular as regards the number and the arrangement of the flux barriers in the rotor structure, and in documents WO 2012/000561 A1, WO 2012/000544 A1, WO 2011/154045 A1, U.S. Pat. Nos. 6,239,526 and 6,769,167, describing possible alternative embodiments, based in each case on the structure described in general in the abovementioned document U.S. Pat. No. 5,818,140.

Figure 1:
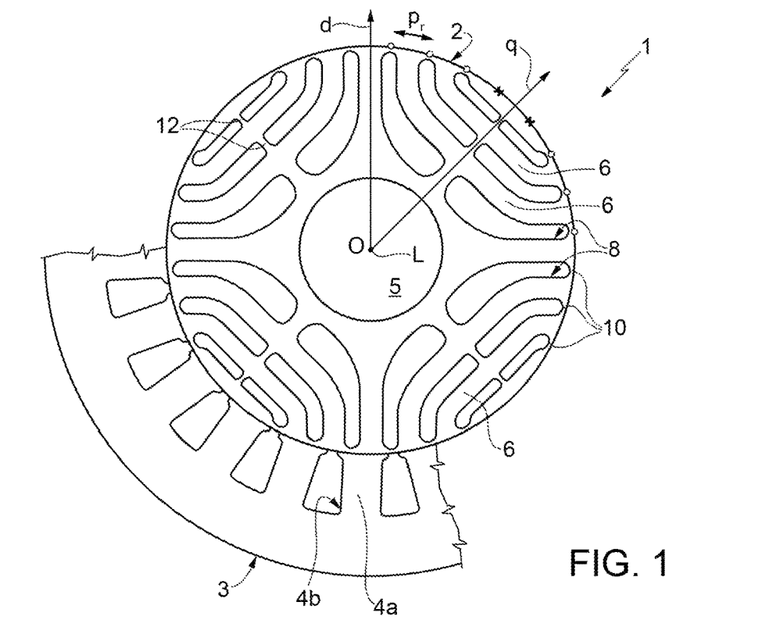
FIG. 1 is a schematic cross-section view of a synchronous reluctance electric machine of a known type.

By way of example, FIG. 1 shows a section of a synchronous reluctance electric machine, of a known type, in particular made according to the teachings contained in document U.S. Pat. No. 5,818,140, and indicated as a whole by 1.

The electric machine 1 comprises a rotor structure 2, having a radial symmetry about a longitudinal axis of extension (typically, the rotor structure 2 consists of a plurality of discs, one of which is shown in FIG. 1, stacked along the longitudinal axis L); and a stator structure 3, arranged in a radially external position with respect to the rotor structure 2, and magnetically coupled to the same rotor structure 2.

The stator structure 3 comprises a plurality of pole expansions 4a (so-called "teeth"), around which corresponding coils (or windings) are wound, not shown in FIG. 1, designed to generate the magnetic field, and electrically connectable to an electrical supply source (not shown), when the electric machine 1 operates as an electric motor by transforming electrical energy into mechanical energy, or to electrical devices or loads, when the electric machine 1 operates as a generator transforming mechanical energy into electrical energy. Stator openings 4b, so-called "stator slots", are defined between the pole expansions 4a.

The rotor structure 2 is provided with a central opening 5 having a centre O, designed to be engaged by a rotation shaft (not shown here), and has an annular arrangement about the same central opening 5.

In particular, the rotor structure 2 has a plurality of magnetic portions 6, made of a suitable ferromagnetic material, and a plurality of flux barriers 8, interposed between and separating them from the magnetic portions 6.

The flux barriers 8 may for example be formed by removal of material, by means of cutting, for example by laser or localised thermal treatments, and include void regions; alternatively, the flux barriers 8 may be made of a suitable non-ferromagnetic material.

The flux barriers 8 are configured to generate anisotropy in the rotor structure 2, so as to define minimum reluctance paths (so-called "d axes") and maximum reluctance paths (so-called "q axes"), for the poles of the same rotor structure 2 (four in number in the example shown in FIG. 1).

In particular, each pole comprises several (typically three to five) magnetic portions 6 and interposed flux barriers 8, having a corresponding shape. An axis of radial symmetry of each pole coincides with the maximum reluctance axis q.

Considering a pair of orthogonal d–q axes, so that the d axis coincides with a direction of minimum reluctance and the q axis coincides with a region of maximum reluctance of the rotor structure 2, the value $L_d/L_q$ is defined as the "anisotropy ratio", where $L_D$ and $L_q$ indicate the inductance values in the two directions.

It is indeed this anisotropy within the rotor structure 2 which enables the electric machine 1 (operating as a motor or as a generator) to produce electromagnetic torque, whose value is greater, the higher the anisotropy ratio $L_d/L_q$.

In particular, when operating as an electric motor, the application of appropriate excitation currents to the coils of the stator structure 3 generates a movement of the rotor structure 2 to align the direction of maximum magnetic permeability (i.e. the d axis) with the direction of the resulting stator magnetic flux. This movement results in an overall rotation of the rotor structure 2 of the electric machine 1, about the axis of rotation. Similarly, during operation of the electric machine 1 as a generator, rotation of the rotor structure 2 causes a variation in the stator magnetic flux and the generation of a resulting electric current in the corresponding coils.

As described in detail in the above-mentioned document U.S. Pat. No. 5,818,140 (to which reference can be made for further details), in order to obtain the desired electromagnetic performance, the number of flux barriers 8 (which defines the "equivalent rotor slots") is appropriately selected according to the number of pole expansions 4 of the rotor structure 3 (which defines the "stator slots"). In particular, real slots of the rotor structure 2, indicated by circles in FIG. 1, are defined at the ends of the flux barriers 8, spaced by a rotor pitch $p_r$; so-called virtual slots of the same rotor structure 2, indicated by x, are defined on the circumference of the rotor structure 2, repeating, in an angularly uniform way about the central axis, the rotor pitch $p_r$.

In particular, it is preferable that the total number of equivalent rotor slots, real and virtual, $n_r$, for each pair of magnetic poles of the rotor structure 2, satisfies the following relationship with the number of stator slots $n_s$: $n_s - n_r = \pm 4$.

The arrangement of the flux barriers 8 inside the rotor structure 2 derives from the fulfillment of this relationship.

In particular, in the embodiment illustrated in FIG. 1, the flux barriers 8 have the shape of concentric semi-ellipses (in the section illustrated, transverse to the longitudinal axis L), symmetrical about the q axis and with increasing axis, from the outer surface to the inner surface of the rotor structure 2, with the major axis of each ellipse joining a pair of real rotor slots. Overall, the flux barriers 8 have a regular shape, convex with respect to the centre O of the central opening 5 of the rotor structure 2.

The rotor structure 2 further comprises a plurality of mechanical connection elements, hereinafter defined simply as "bridges", designed to mutually couple radially adjacent magnetic portions 6, in order to produce an adequate mechanical resistance for the rotor structure 2, in particular in relation to the centrifugal force due to rotation.

In detail, there are circumferential bridges 10, at the ends of the flux barriers 8 and at the outer lateral surface of the rotor structure 2 (i.e. in the vicinity of the gap in the magnetic coupling between the stator structure 3 and the rotor structure 2); and furthermore radial bridges 12, which pass through the flux barriers 8.

Figure 2:
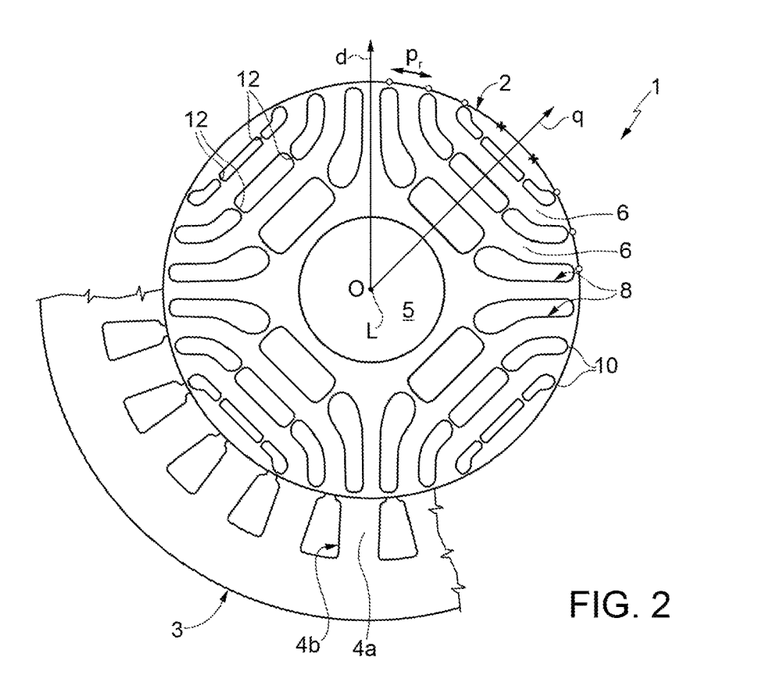
FIG. 2 is a schematic cross-section view of a different embodiment of the synchronous reluctance electric machine of known type of FIG. 1.

In particular, as shown in FIG. 1, a radial bridge 12 can be provided for each flux barrier 8, or, as shown in the embodiment of FIG. 2 (also of a known type) two (or more) radial bridges 12 can be provided for each flux barrier 8, in order to increase a mechanical resistance.

The radial bridges 12 can also be used for housing the magnets inside the rotor structure 2.

DE 10 2014 201740 A1 describes a rotor structure for a reluctance machine, wherein the flux barriers are designed in a manner substantially similar to that described in U.S. Pat. No. 5,818,140 cited previously; the bridges that connect the magnetic portions are in this case arranged overall along a circumferential line.

US 2006/108888 A1 describes a further rotor structure, having only two poles, wherein the flux barriers of each pole are continuous and no provision is made for the presence of radial bridges connecting the magnetic portions.

The present Applicant has realized that, from the point of view of mechanical resistance, increasing the thickness of the circumferential bridges 10 and/or the radial bridges 12, results in an overall reduction in the maximum stress to which the rotor structure 2 is subjected.

However, increasing the thickness of the same circumferential bridges 10 and/or radial bridges 12 causes a reduction in the electromagnetic performance of the electric machine 1, in particular a reduction of the mechanical power produced for the same electrical power input to the electric machine (or, if the operation is generating, a reduction in the electric power generated, for the same mechanical power input).

The present Applicant has realized that, considering a desired electromagnetic performance, known solutions for synchronous reluctance electric machines do not allow to optimise mechanical resistance or strength properties.

SUMMARY OF THE INVENTION

The aim of the present invention is therefore to provide an improved solution for an electric machine, which overcomes the drawbacks discussed above.

According to the present invention, a method for designing a rotor structure of a synchronous reluctance electric machine and a corresponding rotor structure of a synchronous reluctance electric machine are therefore provided, as defined in the appended claims.

BRIEF DESCRIPTION OF THE DRAWINGS

For a better understanding of the present invention, preferred embodiments thereof are now described, purely as non-limiting examples, with reference to the attached drawings, wherein.

DETAILED DESCRIPTION OF THE INVENTION

As will be described in detail below, the present Applicant has identified, by extensive experimental tests and simulations, a methodology of joint optimisation of the electromagnetic properties and mechanical resistance or strength properties of a rotor structure of a synchronous reluctance electric machine, which envisages a suitable modification of the arrangement of the flux barriers and/or mechanical connection bridges of the same rotor structure; this modification improves the structural resistance of the electric machine, without affecting its electromagnetic performance.

Figure 3A:
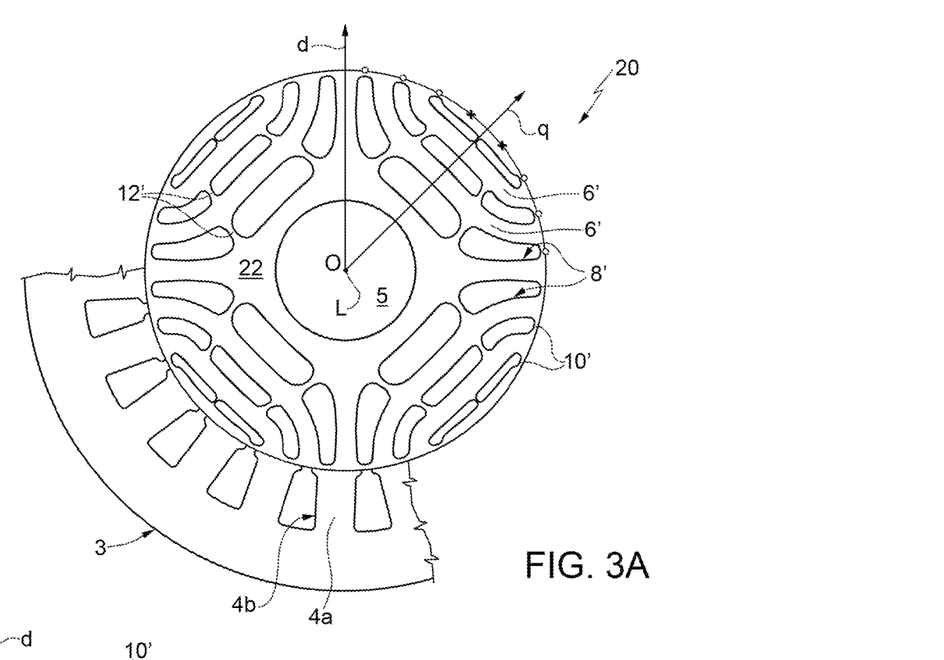
FIG. 3a is a schematic cross-section view of a synchronous reluctance electric machine according to an embodiment of the present solution.

FIG. 3a shows an electric machine, indicated as a whole by 20, in accordance with one embodiment of the present solution.

Figure 3B:
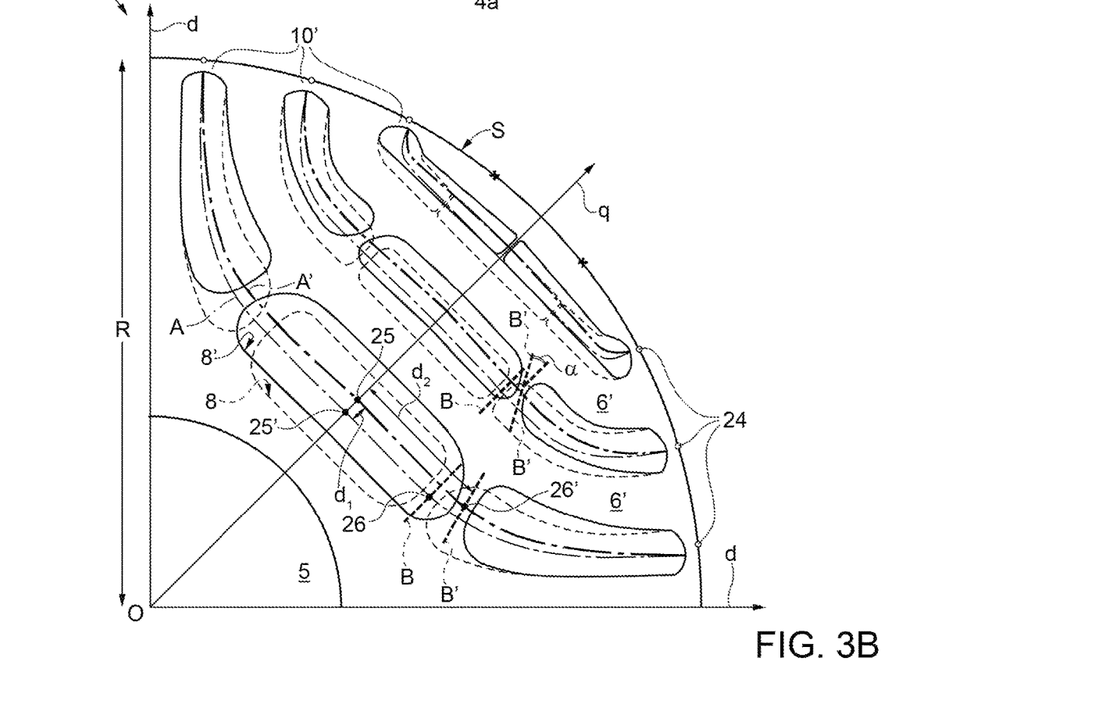
FIGS. 3b, 4a and 4b show an enlarged portion of a rotor structure of the electric machine, according to different embodiments of the present solution.

FIG. 3b shows in detail a portion of the rotor structure 22 of the electric machine 20, having in this example four poles, in particular a portion relating to a single pole of the same electric machine 20, between two d axes orthogonal to each other, a first d axis assumed horizontal, and a second d axis assumed vertical, with the q axis arranged at 45° with respect to the horizontal and vertical d axes.

In particular, a known configuration of the rotor structure (for example of the type discussed with reference to the aforementioned FIG. 1) is shown in FIG. 3b with a dashed line, with the flux barriers again indicated by 8, and the corresponding radial bridges again indicated by 12; while the geometry of the flux barriers 8' (interposed between the magnetic portions 6') and the radial bridges 12' according to one embodiment of the present solution is shown with a continuous line.

In order to describe the features that distinguish the present solution, firstly the profile of the flux barriers 8, 8' is defined, identifying the corresponding centrelines A, A' for each flux barrier 8, 8', while disregarding the presence of the radial bridges 12, 12'. These barrier profiles A, A' can be drawn by joining the centres of the infinite circles tangent to the upper and lower edges of the flux barriers 8, 8' (these upper and lower edges are therefore substantially equidistant with respect to the barrier profile A, A').

As can be seen in FIG. 3b, the geometry of the flux barriers 8' according to the proposed solution complies with the angular position of the equivalent rotor slots, both the real and the virtual ones; in other words, the barrier profiles A' of the flux barriers 8', as well as the barrier profiles A of known type, begin and end at a corresponding pair of equivalent rotor slots, here denoted by 24.

As shown in the same FIG. 3b, the proposed optimised solution envisages a translation in an outward radial direction, in particular along the q axis, of the barrier profiles A' of the flux barriers 8' (and, consequently, of the same flux barriers 8'), assuming the ends fixed and coinciding with the predetermined position of the corresponding equivalent rotor slots 24.

In detail, the intersections of the profiles A, A' of the flux barriers 8, 8' with the q axis are identified, indicated by 25.

The optimized position of the flux barriers 8' is obtained by translating the abovementioned intersections 25 in the radial direction along the q axis and toward the outer surface of the rotor structure 22, by a first translation amount $d_1$, thereby producing the intersection position, indicated by 25', of the profiles A' of the same flux barriers 8' (in other words, the flux barriers 8' are translated radially in an outward direction with respect to an unoptimised starting position).

In order to maintain the cross-sectional area in the ferromagnetic material substantially unchanged, it is convenient to translate all the flux barriers 8 by the same first translation amount $d_1$ (as shown in FIG. 3b); however, it does not exclude the case where each flux barrier 8 is translated by a different amount with respect to the others.

In any event, the theoretical translation limit (thus the maximum value of the translation amount $d_1$) is reached when the upper edge of the radially outermost flux barrier 8' reaches the outer surface, indicated by S, of the rotor structure 22; the maximum value of the translation amount $d_1$ is thus a function of the distance between the upper edge of the radially outermost flux barrier 8' and the outer surface S of the rotor structure 22.

The proposed optimised solution also involves, in addition, or as an alternative, to the above translation of the profiles A of the flux barriers 8, a suitable roto-translation of the position of the radial bridges 12.

In detail, the bisectors B of the radial bridges 12 and the corresponding centreline points 26, defined as the intersections of the same bisectors B with the barrier profiles A of the corresponding flux barriers 8 are identified; the bisector B can be defined as a line parallel to the lateral edges or sides of the radial bridge 12 passing through the centre of the same radial bridge 12; in other words, defining the lines tangent to the ends of the flux barriers 8 at the intersection with the corresponding barrier profile A, the abovementioned bisector B is parallel to these tangential lines and is arranged at the centre point of the portion of the same barrier profile A between the facing ends of the flux barriers 8. This bisector B can therefore be regarded as defining the central axis of symmetry or centreline of the corresponding radial bridge 12.

The optimised position of the radial bridges 12' is obtained by performing a roto-translation of the radial bridges 12 with respect to the centreline points 26; in particular, the position of the bisectors B' of the radial bridges 12' is determined by a translation of the centreline 26 along the profile A' of the flux barriers 8', and also a rotation of the bisector B by an angle α with respect to the q axis.

The amount of roto-translation, as well as the connecting radius r of the centreline points 26, 26' of the radial bridges 12, 12' can be determined on the basis of a finite elements structural optimisation that minimizes the stress within the rotor structure 22.

In a possible embodiment, relating to a rotor structure 22 of the type shown in FIG. 3b, having a number of poles equal to four, the translation of the flux barriers 8, 8' can be expressed in relative value with respect to the maximum radius of the rotor structure 22 (indicated by R in FIG. 3b), with the first translation amount $d_1$ varying between 2% and 10% of the radius R.

The first translation amount $d_1$ may alternatively be expressed as a ratio of the actual translation to the maximum feasible translation (as a function of said distance between the upper edge of the radially outermost flux barrier 8' and the outer surface S of the rotor structure 22); in this case, the first translation amount $d_1$ varies between 30% and 100% (the latter indicating the limiting case in which the flux barrier 8' reaches the outer surface S and thus the air gap).

The translation of the radial bridges 12 along the barrier profile A' of the flux barrier 8' can be expressed by means of a second translation amount $d_2$, with respect to the half-length of the same profile A', i.e. as a function of the distance between the corresponding intersection 25' and the position of the corresponding rotor slot 24; the second translation amount $d_2$, measured along the barrier profile A' between the intersection 25' and the centreline point 26', varies between 30% and 55% of this half-length.

In addition, the angle of rotation a of the bisector B' of the radial bridge 12' with respect to the q axis ranges between 0° and 45°.

The optimisation operations described above result in some immediately detectable and characterising special properties in the resulting configuration of the rotor structure 22, in particular as regards the configuration of the flux barriers 8' and/or the radial bridges 12'.

Figure 4A:
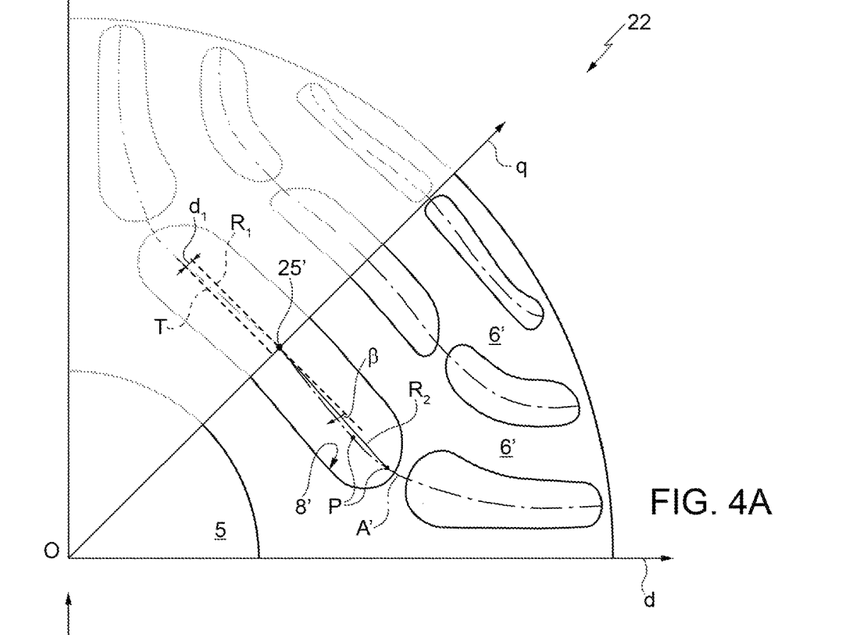

Reference is made first to FIG. 4a, which shows a portion of the rotor structure 22 between a single d axis and a single q axis, with the d axis positioned horizontally and the q axis rotated anticlockwise with respect to the d axis (in particular, this portion corresponds to a single pole and to a first quadrant of the overall rotor structure 22).

For each half-barrier reference line $R_1$ is drawn perpendicular to the q axis, with origin at the intersection 25' between the profile A' of the flux barrier 8' and the q axis inside the portion identified (as discussed previously, the profile of the half-barrier can be obtained by joining the centres of the ideal circumferences tangent to the upper and lower edges of the same half-barrier).

For each flux barrier 8' lines $R_2$ are thus drawn joining the points P which constitute the profile A' with the intersection 25 between the same profile A' and the q axis.

The angle β formed between the line $R_1$ and the reference lines $R_2$ is defined, considering the same angle β positive, as indicated by the arrows of FIG. 4a, in a clockwise direction centred in the point of intersection 25'.

The configuration of the rotor structure 22 is distinguished by the fact that for one or more of the points P, the abovementioned angle β is greater than 0°.

On the contrary, it is easy to demonstrate that, in the known solutions (for example the solution shown in FIG. 1), for one or more of the points P (defined in the same manner) the angle β is ≤0°.

As shown, the barrier profile A' of the flux barriers 8' also has lateral portions, at the outer surface S of the rotor structure 22 and the equivalent rotor slots 24; and a central portion which passes through the q axis. The side portions have convex shape with respect to the centre O of the central opening 5, while the central portion has, unlike the known structures, a shape that is strictly concave with respect to the same centre O.

This property follows from the translation towards the outside of the flux barriers 8'. In particular, for each flux barrier 8', the translation amount $d_1$ can thus analogously refer to a direction orthogonal to the q axis (defined by T in FIG. 4a), substantially passing through the lateral ends of the central portion of the corresponding barrier profile A'.

Figure 4B:
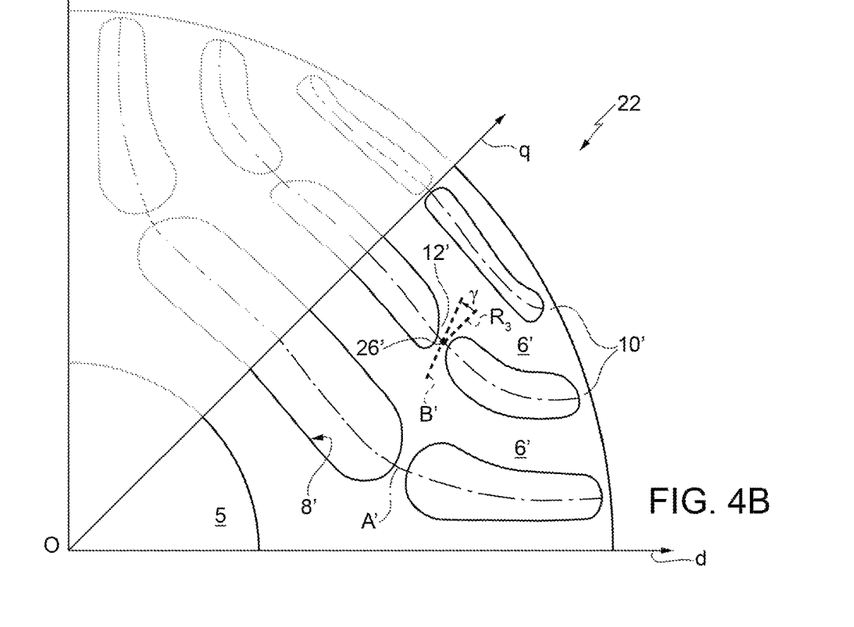

Referring now to FIG. 4b, in the same portion of the rotor structure 22 previously identified, for each radial bridge 12', the corresponding bisector B' (defined as previously illustrated in detail), is drawn which meets the profile A' at the centreline point 26'.

For each radial bridge 12', the reference line $R_3$ is also drawn, parallel to the q axis and passing through the corresponding centreline point 26'.

The angle γ formed between the line $R_3$ and the bisector B' is defined, considering the same angle γ positive, as indicated by the arrows in FIG. 4b, in an anticlockwise direction centred at the centreline point 26'.

The configuration of the rotor structure 22 is distinguished by the fact that for one or more of the radial bridges 12', the abovementioned angle γ is greater than 0°.

On the contrary, it is easy to demonstrate that, in the known solutions (for example the solution shown in FIG. 1), for all the radial bridges 12 the angle γ is ≤0°.

In other words, the bisectors B' of the radial bridges 12' converge towards the maximum reluctance axis q in the direction of the outer lateral surface S of the rotor structure 22.

It is moreover noted that the rotor structure 22 according to the present solution can also have only one of the properties discussed, as regards the positioning of the flux barriers 8' or the radial bridges 12', or, usefully, both properties combined.

Figure 5:
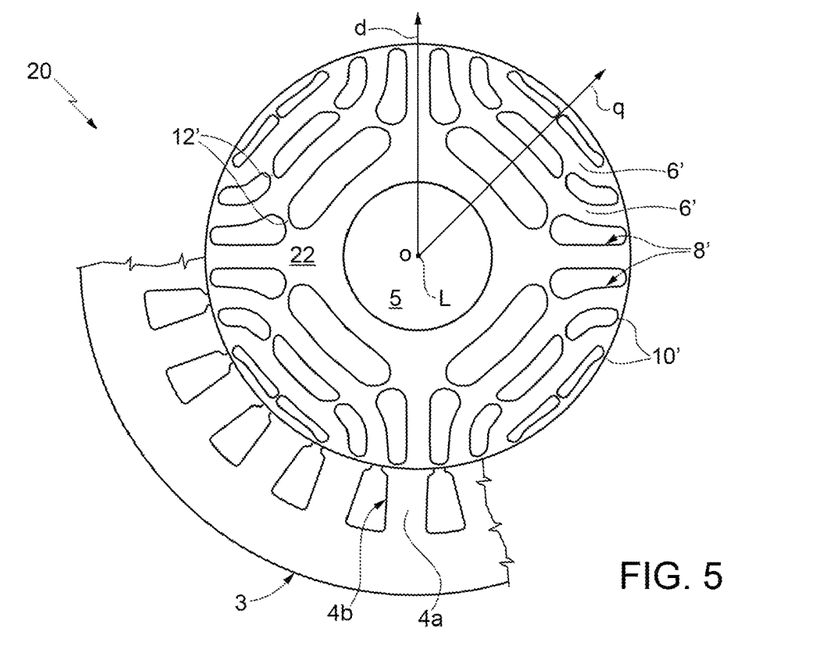
FIGS. 5-6 are schematic cross-section views of a synchronous reluctance electric machine, according to different embodiments of the present solution.

FIG. 5 shows a further embodiment of the rotor structure 22, which implements the optimisation method previously described, wherein the flux barriers 8' are further translated towards the outer surface S of the rotor structure 22 (i.e. towards the air gap of the electric machine 20); in other words, the first translation amount $d_1$ is in this case larger compared to the solution shown in FIGS. 3a and 3b.

Figure 6:
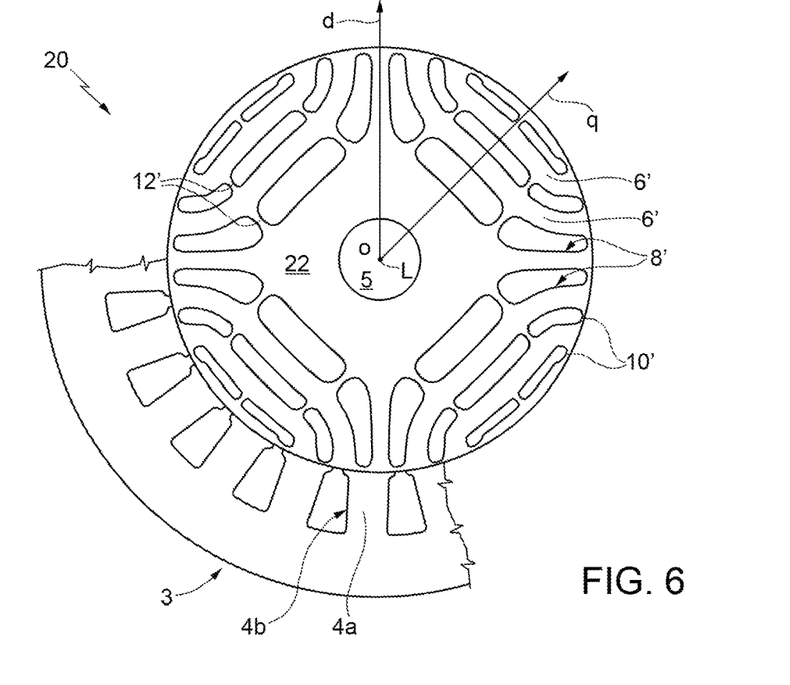

FIG. 6 shows a further embodiment of the electric machine 20, wherein the rotor structure 22 results from the optimisation method previously described, in particular as regards a change in the geometry of the flux barriers 8'.

Figure 7:
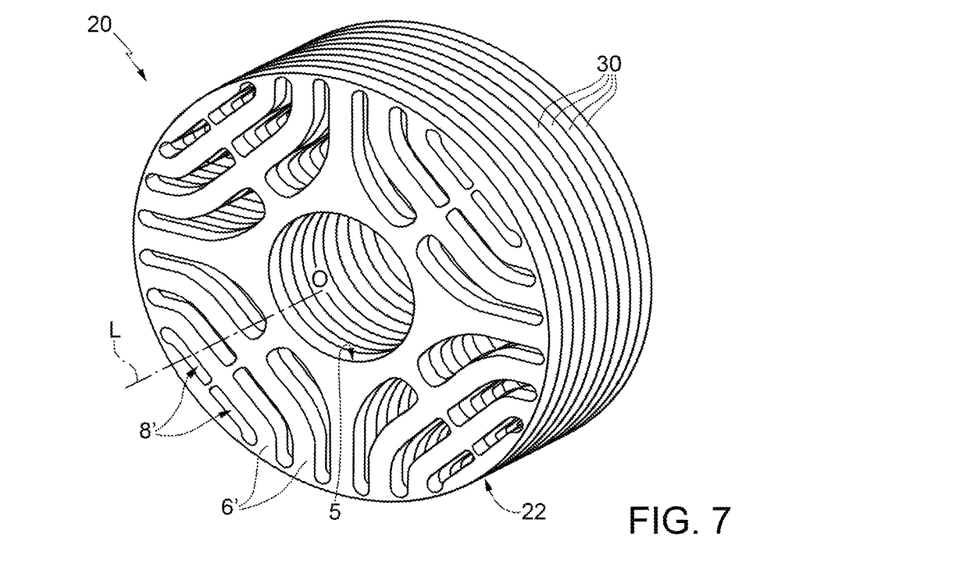
FIG. 7 is a perspective view of the electric machine of FIG. 6.

FIG. 7 shows a three-dimensional perspective view, which shows how the rotor structure 22 consists, in this embodiment, of a plurality of stacked discs, indicated by 30, arranged along the longitudinal axis L, each having the properties previously described in detail.

Alternatively, it is pointed out in each case that the rotor structure 22 may consist of composite (sintered) ferromagnetic materials in a single block.

Figure 8:
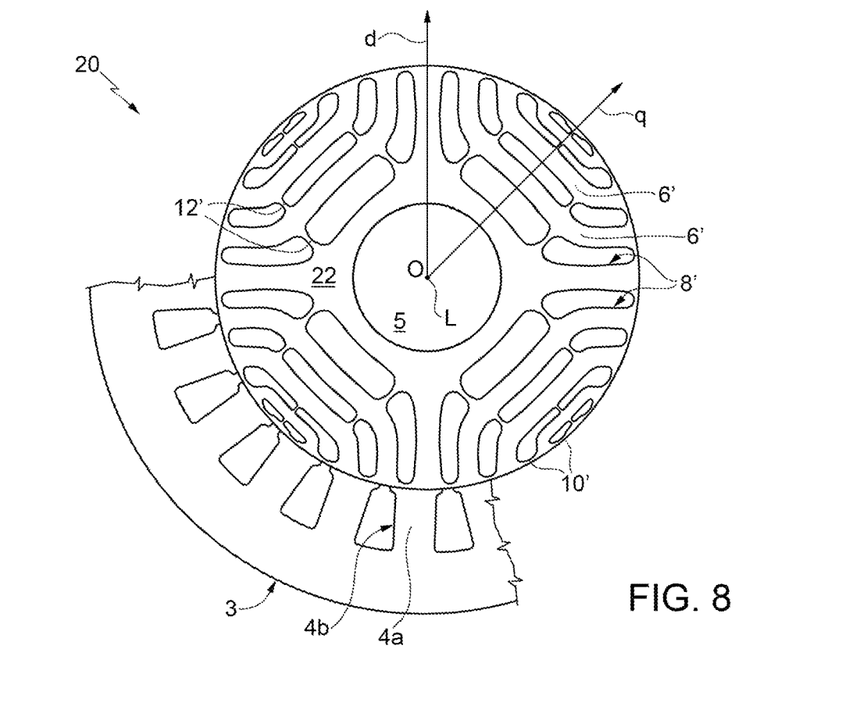
FIG. 8 is a schematic cross-section view of a synchronous reluctance electric machine according to yet a further embodiment of the present solution.

FIG. 8 shows a still further embodiment of the rotor structure 22 of the electric machine 20, having in this case a greater number of flux barriers 8', in this example equal to four.

The advantages of the solution described emerge clearly from the previous discussion.

In particular, it is again pointed out that the rotor structure 22 is jointly optimised both with respect to its electromagnetic properties, and with respect to its mechanical resistance or strength properties, enabling for example its resistance to centrifugal forces to be increased.

The arrangement of the electromagnetic flux barriers 8' is designed so as to jointly optimise electromagnetic performance of the synchronous reluctance electric machine 20 and mechanical resistance properties, for example the resistance to centrifugal forces due to rotation about the rotation shaft. In addition, or independently, the arrangement of the radial bridges 12' is designed in such a way as to jointly optimise the electromagnetic performance and mechanical resistance properties of the synchronous reluctance electric machine 20.

For example, the present Applicant has verified through simulations and experimental tests, that the proposed rotor structure has a rotor structural resistance up to 20-30% greater (under operating conditions at a maximum speed) with respect to existing structures, for example as described in the above DE 10 2014 201740 A1 and U.S. Pat. No. 5,818,140, thanks to the appropriate design of the profile of the flux barriers and, independently or jointly, to the optimisation of the radial bridges. The solution described is therefore particularly beneficial in the case where it is necessary to design an electric machine 20 which is required to operate at high rotation speeds and/or at high power.

Tests and simulations carried out by the Applicant have verified the possibility of increasing the rotation speed of the electric machine 20 by 20% to 30% compared to traditional solutions, without compromising its mechanical resistance, in particular to centrifugal forces.

In yet other words, with respect to known solutions, the thickness of the radial bridges 12' and/or circumferential bridges 10' (closing the equivalent rotor slots), can be reduced without exceeding the allowable limits of mechanical resistance (given a same speed of rotation of the electric machine 20) to the benefit of the electromagnetic performance.

Finally, it is clear that modifications and variations can be made to what described and illustrated herein, without thereby departing from the scope of the present invention as defined in the appended claims.

In particular, it is noted that the design method according to the present solution has beneficial application for any rotor structure (for example also designed with different criteria from those described with reference to FIG. 1), for the optimisation of the related properties by means of the design techniques for the flux barriers and the radial bridges previously described in detail.

For example, one of the criteria for the design of known structures may provide that the sections of ferromagnetic material are to be calculated on the basis of the amount of magnetic flux generated by the stator in the different circular portions and that the size of the portions of non-ferromagnetic material are sized keeping constant the reluctance of each flux barrier.

The number of radial bridges 12' as well as the number and the geometric shape of the flux barriers 8' may vary with respect to what is illustrated by way of example. For example, for the purpose of determining the applicability of the proposed method, the radial bridges 12' of the flux barriers 8' may be present, not present or may be present in a different number.

Figure 9:
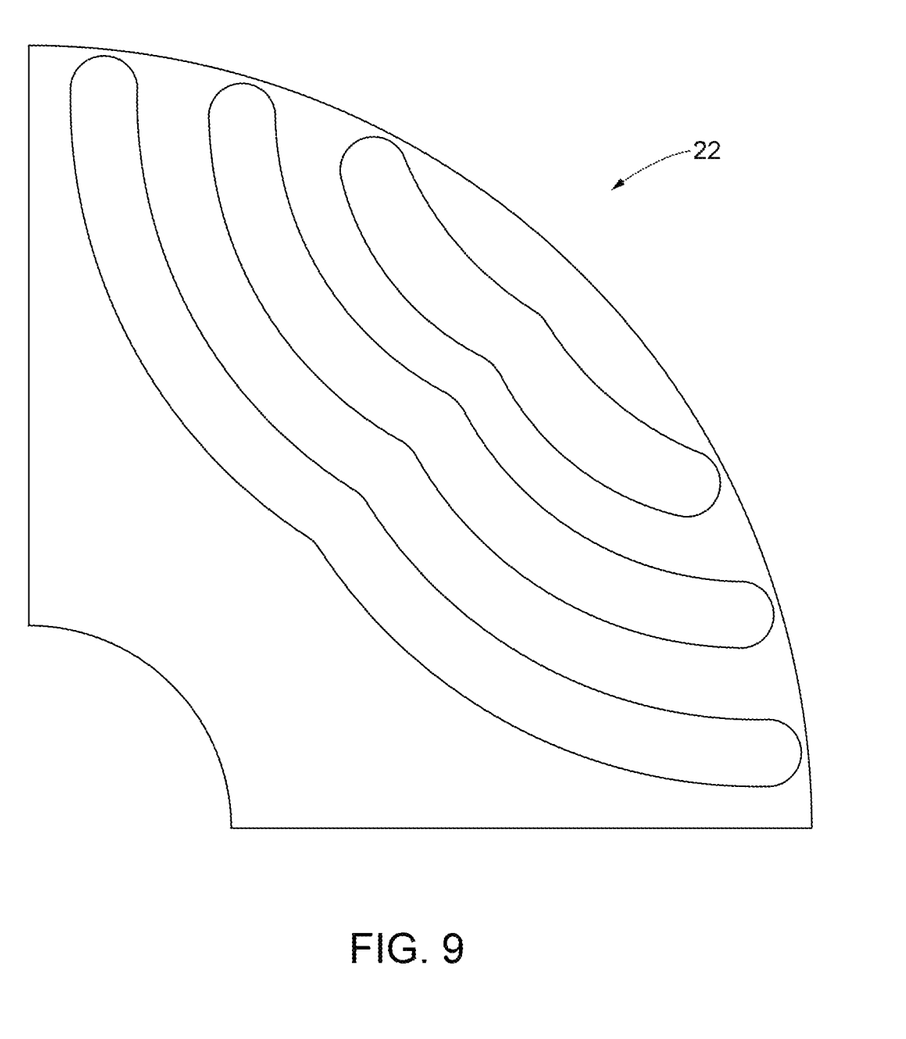
FIG. 9 is a schematic cross-section view of a portion of a further embodiment of the rotor structure of the reluctance machine.

By way of example, FIG. 9 shows a schematic view of a further possible embodiment, in which there are no radial bridges (FIG. 9 refers by way of example to a single pole of the rotor structure 22). In this case, the starting (unoptimised) shape of the flux barriers is for example of circular type, and is then appropriately translated according to the design criteria previously described in detail. It is easy to demonstrate that in the resulting rotor structure 22, analogously to what has been described above, there are one or more points P of the centreline profile of the flux barriers, having an angle β greater than 0°.

In addition, in a known manner, the circumferential bridges 10' and radial bridges 12' can be formed from the same ferromagnetic material that the rotor structure 22 consist of, or can be made starting from the same ferromagnetic material with localised treatment (for example by laser) so as to increase the mechanical properties (yield) and reduce the ferromagnetic properties.

In addition, the circumferential bridges 10' and radial bridges 12' can be made from a material different from the ferromagnetic material that the main body of the rotor structure 22 consists of, and anchored to the main body itself by appropriate methods.

Magnets can also be inserted inside the flux barriers 8', in a similar way as in known solutions.

As described in document WO 2011/018119 A1, a further variant may also provide that the rotor structure 22 is formed by segments of ferromagnetic material with voids between the various segments, suitably spaced and attached by fastening means and spacers of various nature, arranged so as to create in this case the flux barriers 8'.

The reluctance geometries can also be conveniently obtained by using biphasic materials (for example as described in US 2008/0296994 A1) and in this case be particularly compact, durable and reliable.

Finally, it should be noted that the electric machine 20 may be beneficially configured to be coupled in an integrated manner to a fluid-dynamic machine.

The invention claimed is:

1. A method for making a rotor structure of a synchronous reluctance electric machine, wherein the rotor structure has an annular arrangement about a central opening, having a center and designed to be engaged by a rotation shaft, and a plurality of magnetic portions and a plurality of electromagnetic flux barriers interposed between the magnetic portions, said electromagnetic flux barriers defining at least one maximum magnetic reluctance path along a maximum reluctance axis and a minimum reluctance path along a minimum reluctance axis, comprising the step of forming the annular arrangement of said electromagnetic flux barriers so as to jointly optimize electromagnetic performance of said synchronous reluctance electric machine and mechanical resistance properties, in particular the resistance to centrifugal forces due to rotation about said rotation shaft, wherein, said step of forming comprises forming each electromagnetic flux barrier so that: a central portion of a corresponding centerline profile, which crosses said maximum reluctance axis at an intersection, has side ends, and said intersection is shifted by a first quantity along the maximum reluctance axis with respect to an orthogonal line, perpendicular to said maximum reluctance axis and passing through said side ends.

2. The method according to claim 1, wherein said centerline profile, is arranged equidistant between an upper and a lower edge of the electromagnetic flux barriers, said electromagnetic flux barriers having side portions arranged towards said outer side surface of said rotor structure and a central portion crossing said maximum reluctance axis; wherein said central portion of said centerline profile crossing said maximum reluctance axis has a strictly concave shape in the direction of the center of said central opening.

3. The method according to claim 2, wherein said corresponding centerline profile has side portions that have a convex shape in the direction of the center of said central opening; and wherein the centerline profiles of the electromagnetic flux barriers define a constant pitch of equivalent rotor slots, at said outer side surface of said rotor structure, said equivalent rotor slots being designed so as to be magnetically coupled to corresponding stator slots of said electric machine.

4. The method according to claim 1, wherein said centerline profile for each electromagnetic flux barrier is defined as the line joining the centers of ideal circumferences tangent to both upper and lower edges of the electromagnetic flux barrier.

5. A method for making the synchronous reluctance electric machine, comprising making the rotor structure, according to claim 1, and further making a stator structure, operatively coupled to the rotor structure and arranged in a position radially external to said rotor structure, with respect to said central opening.

6. The method according to claim 1, wherein the rotor structure has a radius with respect to the centre of said central opening, and wherein the first quantity comprises between 2% and 10% of the radius of said rotor structure.

7. The method according to claim 1, wherein the first quantity comprises between 30% and 100% of a distance between an upper edge of a radially outermost electromagnetic flux barrier and an outer side surface of said rotor structure.

8. A method for making a rotor structure of a synchronous reluctance electric machine, wherein the rotor structure has a center and an annular arrangement about a central opening, and designed to be engaged by a rotation shaft, and a plurality of magnetic portions and a plurality of electromagnetic flux barriers interposed between the magnetic portions, said electromagnetic flux barriers defining at least one maximum magnetic reluctance path along a maximum reluctance axis and a minimum reluctance path along a minimum reluctance axis, wherein the rotor structure further comprises radial connecting elements for mechanical connection between radially-adjacent magnetic portions comprising: forming said radial connecting elements so as to jointly optimize the electromagnetic performance of said synchronous reluctance electric machine and the mechanical resistance properties, in particular the resistance to centrifugal forces due to rotation about said rotation shaft; wherein the step of forming comprises forming said radial connecting elements that have a corresponding centerline axis converging towards said maximum reluctance axis in a direction of an outer side surface of said rotor structure, each with a respective angle of inclination.

9. The method according to claim 8, wherein said radial connecting elements separate flux barrier portions, and wherein said corresponding centerline axis is defined as a line parallel to lines tangent to facing sides of the separated flux barrier portions at their intersection with a centerline profile of the electromagnetic flux barrier, and arranged at a center point between said facing sides.

10. The method according to claim 9, wherein said electromagnetic flux barriers have the centerline profile, and the corresponding centerline axis of said radial connecting elements intersects the centerline profile at between 30% and 55% of a half-length of said centerline profile, and further comprising an angle between said corresponding centerline axis and said maximum reluctance axis for one or more of said radial connecting elements is in the range between 0° and 45°.

11. The method according to claim 9, wherein said electromagnetic flux barriers have the centerline profile arranged between a corresponding upper and lower edge, wherein the centerline axis for each of said radial connecting elements intersects the centerline profile at the centerline point, and wherein, once a respective reference line is defined parallel to the maximum reluctance axis and passing through the centerline point, and once the respective angle of inclination is defined between the respective reference line and the centerline axis, considered positive towards said maximum reluctance axis and centered on the centerline point, said respective angle of inclination, for one or more of said radial connecting elements, is greater than 0°.

12. A rotor structure of a synchronous reluctance electric machine, having an annular arrangement about a central opening having a center and designed to be engaged by a rotation shaft, comprising: a plurality of magnetic portions and a plurality of electromagnetic flux barriers interposed between the magnetic portions, said electromagnetic flux barriers defining at least one maximum magnetic reluctance path along a maximum reluctance axis and a minimum magnetic reluctance path along a minimum reluctance axis,
   wherein said electromagnetic flux barriers have a centerline profile, which is arranged equidistant between a corresponding upper and lower edge, and side portions arranged towards an outer side surface of said rotor structure, and a central portion, which crosses said maximum reluctance axis, and has a strictly concave shape in the direction of the center of said central opening,
   wherein the central portion of a corresponding centerline profile, which crosses said maximum reluctance axis at an intersection, has side ends, and wherein said intersection is shifted by a first quantity along the maximum reluctance axis with respect to an orthogonal line, perpendicular to said maximum reluctance axis and passing through said side ends.

13. The structure according to claim 12, wherein for each flux barrier: once a reference line perpendicular to the maximum reluctance axis, with origin at the intersection between the corresponding centerline profile of the flux barrier and the maximum reluctance axis, has been defined; once lines joining points which form the centerline profile with the intersection between said centerline profile and the maximum reluctance axis have been defined; once an angle formed between the reference line and said lines has been defined, and considering said angle positive in the direction of said central opening with centers in intersection points, for one or more of said points (P), the respective angle ($\beta$) is greater than 0°.

14. The structure according to claim 12, wherein the rotor structure has a radius with respect to the center of said central opening, and wherein the first quantity is comprised between 2% and 10% of the radius of said rotor structure.

15. The structure according to claim 12, wherein the first quantity is comprised between 30% and 100% of a distance between an upper edge of a radially outermost electromagnetic flux barrier and the outer side surface of said rotor structure.

16. A rotor structure of a synchronous reluctance electric machine having an annular arrangement about a central opening and having a center and designed to be engaged by a rotation shaft, comprising a plurality of magnetic portions and a plurality of electromagnetic flux barriers interposed between the magnetic portions, said electromagnetic flux barriers defining at least one maximum magnetic reluctance path along a maximum reluctance axis and a minimum magnetic reluctance path along a minimum reluctance axis, wherein said electromagnetic flux barriers have a centerline profile, which is arranged equidistant between a corresponding upper and lower edge, and have side portions arranged towards an outer side surface of said rotor structure and a central portion, which crosses said maximum reluctance axis and has a strictly concave shape in the direction of the center of said central opening,
   comprising: radial connecting elements for mechanical connection between radially adjacent magnetic portions, wherein said radial connecting elements have a centerline axis converging towards said maximum reluctance axis in a direction of the outer side surface of said rotor structure, each with a respective angle of inclination.

17. The structure according to claim 16, wherein the centerline axis for each of the said radial connecting elements intersects the centerline profile at a centerline point, and wherein, once a respective reference line is defined parallel to the maximum reluctance axis and passing through the centerline point, and once an angle is defined between the reference line and a bisector, considered positive towards the maximum reluctance axis and centered on the centerline point, said angle ($\gamma$) for one or more of said radial connecting elements is greater than 0°.

18. An electric machine, comprising said rotor structure according to claim 12, and further comprising a stator structure, operatively coupled to the rotor structure and arranged in a position radially external to said rotor structure, with respect to said central opening.

19. The structure according to claim 16, wherein said radial connecting elements separate flux barrier portions, and wherein said centerline axis is defined as a line parallel to lines tangent to facing sides of said flux barrier portions at their intersection with said centerline profile, and arranged at a centre point between said facing sides.

* * * * *